United States Patent Office 3,788,940
Patented Jan. 29, 1974

3,788,940
POLYOLEFIN-POLYAMIDE COMPOSITE FILAMENTS HAVING AN IMPROVED ADHERING PROPERTY AND A METHOD THEREOF
Fumimaro Ogata, Osaka, and Katsuhiko Nagamine, Settsu, Osaka-fu, Japan, assignors to Kanegafuchi Boseki Kabushiki Kaisha, Tokyo, Japan, and Snia Viscosa Societa Nazionale Industria Applicazioni Viscosa S.p.A., Milan, Italy
No Drawing. Continuation-in-part of abandoned application Ser. No. 605,170, Dec. 28, 1966. This application July 11, 1969, Ser. No. 841,146
Int. Cl. D02g 3/00
U.S. Cl. 161—173                         6 Claims

ABSTRACT OF THE DISCLOSURE

Composite filaments of a polyolefin and a polyamide which are highly crimpable without separation or cleavage are produced by the conjugate spinning of (1) a molten fiber-forming polyamide selected from the group consisting of nylon-11 nylon-12, nylon-11.10, nylon-11.11 and nylon-11.12 and (2) a molten fiber-forming polyolefin selected from the group consisting of polyethylene and polypropylene. The conjugate spinning ratio of the two polymeric materials which are employed to form the composite filaments is maintained between 8:2 and 2:8, ratios outside such range involving difficulties. Additionally, in using heat to effect the crimping, the temperature is maintained between about 70° and about 150° C.

---

This application is a continuation-in-part of the copending application Ser. No. 605,170 filed Dec. 28, 1966, and now abandoned.

The present invention relates to a composite filament consisting of two different components of fiber-forming thermoplastic synthetic linear polymers which are arranged in a side-by-side relationship extending uniformly along the entire length of the filament and having a crimp-developability upon exposure to heat or swelling agent, and to a method for producing such filaments.

Thermoplastic synthetic linear polymers, such as polyamides, polyesters, polyolefins, etc., provide synthetic fibers having improved strength and elongation, durability and resistance to washing, but the fibers formed from these polymers have disadvantages in covering ability, dyeing affinity, hygroscopicity, so that copolymerization, blends and many other chemical or physical improvements have been proposed.

Among these, a method of producing composite filaments wherein different polymers are melted separately, fed to a common orifice and bonded in spinning to produce a composite filament in which the different polymers are extended and bonded uniformly along the longitudinal direction of the unitary filament, has recently been of interest, because the obtained composite filament has not only each property of the different polymers constituting the fialment, but also has a latent crimpability which can be developed by subsequent simple heat treatment or swelling treatment. In the production of such a composite filament, the method wherein the different polymers are bonded to each other in a side-by-side relationship is advantageous because such a method is carried out by a relatively simple spinning apparatus. However, in this case, in order to ensure improved mutual adhering properties of the polymers to be used, polymers having relatively similar chemical properties or structures such as copolymer and a homopolymer, the copolymer consisting mainly of the component monomer of the said homopolymer, or a blended polymer consisting mainly of said homopolymer must be used, so that the obtained fibers have difficulty in their crimpability, and also cannot be improved in their properties by combining different fibers to balance the merits and faults of each other.

The inventors, with these problems in mind, have made systematic investigation with respect to the affinity of polyolefin polymers to various polyamide polymers, the latter having considerably different chemical and physical properties from polyolefins, and have discovered that only specific kinds of polyamides have excellent affinity for polyolefins, that is, mutual adhering property to polyolefins, and the present invention has been achieved.

An object of the present invention is to obtain a side-by-side composite filament from polyamide polymer and polyolefin polymer having an excellent crimp-developability without causing split and cleavage of the two polymers.

Another object of the present invention is to provide a novel composite filament having both properties of polyolefin fiber and polyamide fiber.

The above described objects can be achieved by a method of producing a composite filament wherein two polymers are melted separately and extruded through a common orifice simultaneously to produce a composite filament in which these polymers are extended uniformly and in a side-by-side relationship along the longitudinal direction of unitary filament, characterized in that one polymer is a polyolefin selected from the group consisting of polyethylene, polypropylene, the copolymers thereof and the blended polymers thereof and the other polymer is a higher linear polyamide selected from the group consisting of nylon-11, nylon-12, nylon-11.10, nylon-11.11 and nylon-11.12 and a ratio by volume of the polyolefin to the polyamide is 2:8 to 8:2.

The polyolefin used in the present invention is not limited by its manufacturing method and molecular structure, but polymers having both the isotactic structure and the atactic structure can be used. Moreover, the polymerization degree is not important, as far as the polymers have fiber-forming ability.

When nylon is used having carbon atoms of less than 9 in the recurring structural unit, splitting or cleavage will occur between nylon and polyolefin during the drawing process or other several processes after drawing, so that desired composite filament cannot be obtained. Especially, nylon-6 and nylon-66 have substantially no affinity to polyolefin, so that they cannot be applied for the invention. The polyamides having recurring structural units of more than 13 carbon atoms have lower melting points and they are not suitable for fiber-forming materials.

Higher linear polyamides having the above mentioned range of carbon atoms in the recurring structural units can form improved fibers even solely, but among polyamides which have been previously considered to be impossible to produce composite filaments by combining with polyolefins, only such higher linear polymers show a good adhering property to the polyolefin and can be used to the method according to the invention.

According to the invention, the conjugate ratio of the two polymers can be selected optionally within the range of 8:2 to 2:8 by volume, preferably 7:3 to 3:7 by volume depending upon the purposes, and the conjugate ratio exceeding this range reduces the crimpability of the obtained composite filament and is not preferred.

The two polymers to be bonded are melted separately, fed to a spinneret for conjugate spinning respectively, extruded through the same orifice simultaneously at the delivery amounts corresponding to the predetermined conjugate ratio into air or into a cold liquid medium, if necessary, to form a unitary filament, which is subsequently taken up on a bobbin.

Of course, a well known type of spinneret for conjugate spinning can be used, but in order to remove the difficulties due to a large difference of melting point between the two polymers, it is preferable to use a type of spinneret means for spinning disclosed in U.S. patent application No. 568,016, filed July 26, 1966 and now U.S. Pat. 3,518,223.

According to the present invention, the composite filament having an improved mutual adhering property can be obtained by heat-drawing the undrawn filament as described above at a temperature of 70° to 150° C. In this case, the draw ratio is not particularly limited and a suitable means for drawing, such as a hot plate and a heated snubbing pin can be employed.

When cold-drawing undrawn composite filament composed according to the present invention, a large strain occurs in the area of bonding of the polymers due to a difference of tension stress based on the difference of drawability between polyamide and polyolefin resulting in yarn breakage and splitting between the two components, so that such cold-drawing is not preferable.

In the heat-drawn composite filament according to the present invention, the two components are bonded strongly and if the composite filament is relaxed just after drawing, very strong spiral crimps are developed spontaneously different from conventional crimped fibers. When the composite filament is subjected to hot air, hot water, heated steam or a suitable swelling agent under a tensionless state, extremely improved crimps can be developed. The crimps are formed based on the remarkable difference of heat shrinkability of polymers having entirely different properties, so that these crimps are much more fine and strong spiral three dimensional crimps than those of conventional composite filament consisting of same series of polymers and although both the polymers constituting the filament have different properties, these polymers are not split and cleaved even after employing for a long period of time, so that crimpability decreased in a certain degree by a tension applied repeatedly or continuously can easily be restored by a simple heat-treatment.

Further, the composite filament obtained by a method according to the invention is not only remarkably more light and has a higher strength, elongation, bulkiness and covering property, but also has an improved dyeing ability, hygroscopicity, etc., as compared with conventional polyamide fibers; and moreover cheap polyolefin may be used as a part of fiber-forming materials, so that the manufacturing cost can be decreased. Furthermore, when using a homopolymer as one polymer and the similar copolymer as the other polymer in production of conventional composite filament, if a copolymerization ratio of the copolymer is increased in order to improve the crimpability, a drawback could not be avoided that the filaments were often stuck, but the fiber obtained according to the invention has the merit that such a sticking phenomenon and troubles accompanied with it do not happen at all.

The invention will be explained further in details by the following examples.

In the examples, adhering property between the two polymers constituting unitary filament is shown as adhesive strength of these polymers. The adhesive strength was determined as follows: That is, samples having a length of about 10 cm. of filament were used. These samples were divided into the two components at one end along a short length by forcedly bending, or with a swelling agent such as 10% formic acid and the like, and then the end of one divided component was pulled at a given velocity and the tension necessary to divide the two components is recorded electrically by strain gauge. The determination was made by using strain gauge having a measuring range of ±4 grw. at a splitting velocity of 2.0 cm./min. and the measured tension value was divided by the length of bonded line of the two components at the cross-section of the filament as correction of the denier and bonded surface, and the obtained value was used as the adhesive strength. Percent of crimp was determined as follows: That is, 30 filaments having 25 cm. of length were bundled to prepare a sample. The sample, or the bundle, was dipped in boiling water for 10 minutes under no load to develop crimps, and then the sample was dried. The length of the dried bundle was $L_1$.

Then the length, when the crimps were removed by suspending a load of 0.3 g./d. at one end of the dried bundle, was $L_2$. Then the percent of crimp was shown by the following formula.

$$\text{Percent of crimp (percent)} = \frac{L_2 - L_1}{25} \times 100$$

Intrinsic viscosity of nylon was determined as follows. 0.2 to 0.6 g. of the polymer was dissolved in m-cresol at 30° C. to obtain 100 cc. of the solution.

The value subtracted 1 from a ratio of time of flow of the polymer solution in seconds to time of flow of the solvent in seconds by means of Ostwald's viscosimeter was plotted on ordinate and the concentration was plotted on abscissa, and the value at a point of intersection with the axis of ordinate when extrapolated at a concentration of 0 was the intrinsic viscosity.

EXAMPLE 1

As a polyolefin polymer, use was made of polyethylene having a density of 0.930 g./cm.$^3$ and a melt-index (hereinafter abridged as MI, ASTM-D-1238, g./10 min., 190° C.) of 20, and as polyamide polymers use was made of nylon-6, nylon-11, nylon-11.10, nylon-11.12 and nylon-12 having an intrinsic viscosity of 1.17, 1.0, 1.13, 1.08 and 1.15 respectively. Said polyethylene and polyamide were melted separately and conjugate spun by using a conventional spinneret for conjugate spinning at a feed speed volume ratio of 50:50 to a side-by-side relationship, and the resulting filament was taken up on a bobbin. In the case of nylon-6, the spinning temperature was 250° C. and in the case of the higher polyamide, the spinning temperature was 225° C. The filament thus obtained was further drawn 4.2 times the original length on a hot pin heated at 70° C. to obtain a composite filament having 16.3 deniers.

The properties of the various drawn composite filaments thus obtained are shown in Table 1.

TABLE 1

| Polyamides to be bonded with polyethylene | Nylon-6 | Nylon-11 | Nylon-11.10 | Nylon-11.12 | Nylon-12 |
| --- | --- | --- | --- | --- | --- |
| Strength (g./d.) | 3.9 | 4.1 | 3.7 | 3.6 | 4.1 |
| Elongation, percent | 39.4 | 27.6 | 28.3 | 30.6 | 28.1 |
| Young's modulus (g./d.) | 23.3 | 26.5 | 21.8 | 22.9 | 25.7 |
| Percent of crimp | 58 | 77 | 76 | 80 | 79 |
| Adhesive strength (g./cm.) | 18 | 97 | 82 | 94 | 98 |

Table 1 shows that the composite filament produced from higher copolyamide and polyethylene by the method according to the invention has a considerably improved mutual adhering property, and moreover the fiber treated with hot water has a high crimp.

EXAMPLE 2

Conjugate spinning was carried out in the same manner and condition as described in Example 1, except using polyethylene having a density of 0.960 g./cm.$^3$ and a MI of 7 (ASTM–D–1238, g./10 cm., 190° C.) and the resulting drawn fiber has properties as shown in Table 2.

TABLE 2

| Polyamides to be bonded with polyethylene | Nylon-6 | Nylon-11 | Nylon-11.10 | Nylon-11.12 | Nylon-12 |
|---|---|---|---|---|---|
| Strength (g./d.) | 4.8 | 5.1 | 5.0 | 4.7 | 5.2 |
| Elongation, percent | 28.3 | 31.5 | 29.1 | 30.2 | 30.6 |
| Young's modulus (g./d.) | 24.1 | 22.8 | 21.9 | 22.0 | 24.3 |
| Percent of crimp | 51 | 72 | 69 | 75 | 74 |
| Adhesive strength (g./cm.) | 16 | 89 | 81 | 87 | 90 |

Fibers obtained by a method according to the invention were excellent in mutual adhering property and shrinkability.

EXAMPLE 3

Isotactic polypropylene having an intrinsic viscosity of 1.45 and a MI of 6 (ASTM–D–1238, g./10 cm., 190° C.) and nylon-66 having intrinsic visosity of 1.18 or nylon-11.12 having an intrinsic viscosity of 1.13 were melted separately and conjugate spun by using a spinneret for conjugate spinning at 275° C. of nozzle temperature and at a feed volume ratio of 50:50 in a side-by-side relationship and the resulting filament was taken up on a bobbin at a draft of 110, and thereafter drawn 5.0 times the original length on a hot plate heated at 115° C. to obtain a composite filament having 1.38 denier. The properties of the drawn composite fiber thus obtained are shown in Table 3.

TABLE 3

| Polyamides to be bonded with polypropylene | Nylon-66 | Nylon-11·12 |
|---|---|---|
| Strength (g./d.) | 6.6 | 5.7 |
| Elongation, percent | 22 | 28 |
| Young's modulus (g./d.) | 26.9 | 23.2 |
| Percent of crimp | 57 | 72 |
| Adhesive strength (g./cm.) | 14 | 68 |

As seen from Table 3, the composite filaments obtained by the method according to the invention have an improved crimpability and mutual adhering property. Furthermore, specific gravity of the above two kinds of composite filaments were measured to find that composite filament made from conventional nylon-66 and polypropylene has a specific gravity of 1.03, while composite filament made from nylon-11.12 and polypropylene according to the invention has a specific gravity of 0.95, so that the latter filament has a relatively light specific gravity.

Entirely similar results to those indicated in Example 3 and its Table 3 are obtained when an atactic polypropylene is combined with nylon-11.12.

EXAMPLE 4

Conjugate spinning was carried out in the same manner and condition as described in Example 3, except using isotactic polypropylene having an intrinsic viscosity of 1.26 and a MI of 10 (ASTM–D–1238, g./10 cm., 190° C.) and using as polyamides nylon-66 having an intrinsic viscosity of 1.18 and nylon-11/nylon-12 copolymer (copolymerization ratio 90:10) having an intrinsic viscosity of 1.18.

Properties of the obtained drawn fiber are shown in Table 4.

TABLE 4

| Polyamides to be bonded with polypropylene | Nylon-66 | Nylon-11/Nylon-12 |
|---|---|---|
| Strength (g./d.) | 5.5 | 5.2 |
| Elongation, percent | 28 | 34 |
| Young's modulus (g./d.) | 25.7 | 22.1 |
| Percent of crimp | 59 | 71 |
| Adhesive strength (g./cm.) | 16 | 72 |

A load of 1 g./d. was applied to the above two crimped fibers for 10 minutes and then removed. After left to stand for 5 minutes, the above mentioned load was applied again. As the result of repeating 5 times such an operation, the composite filament containing nylon-66 was separated mostly into two components, while the composite filament containing nylon-11/nylon-12 according to the invention had a strong mutual adhering property still.

EXAMPLE 5

The undrawn composite filaments, which were conjugate spun in a side-by-side relationship from polyethylene and nylon-11 as described in Example 1, were drawn at various drawing temperatures and draw ratios to obtain the results as shown in the following Table 5.

TABLE 5

| Drawing temperature (° C.) | Draw ratio (times) | Strength (g./d.) | Elongation, percent | Young's modulus (g./d.) | Percent of crimp | Adhesive strength (g./cm.) |
|---|---|---|---|---|---|---|
| 25 | 3.8 | 2.9 | 46.1 | 12.0 | 54 | 54 |
| 25 | 4.2 | 3.5 | 29.0 | 26.6 | (1) | (1) |
| 50 | 3.8 | 3.4 | 40.5 | 18.7 | 57 | 61 |
| 50 | 4.2 | 3.7 | 29.9 | 26.2 | 62 | 58 |
| 50 | 4.6 | 4.2 | 25.1 | 27.4 | (1) | (1) |
| 80 | 3.8 | 4.0 | 29.2 | 24.1 | 77 | 98 |
| 80 | 4.2 | 4.1 | 27.7 | 26.3 | 78 | 97 |
| 80 | 4.6 | 4.5 | 23.3 | 29.1 | 78 | 96 |
| 150 | 4.2 | 4.0 | 27.1 | 25.8 | 79 | 98 |
| 150 | 4.6 | 4.4 | 21.2 | 30.7 | 79 | 98 |
| 150 | 5.0 | 4.9 | 19.2 | 31.5 | 77 | 96 |
| 200 | 4.2 | Drawing was impossible because polymers softened at high temperature | | | | |
| 200 | 4.6 | Drawing was impossible because polymers softened at high temperature | | | | |

1 Measurement was impossible due to separation of two components.

As seen from Table 5, when the drawing temperature is 25° C. or 50° C., the elongation between two components is different, so that the separation between two polymers occurs if the filament is drawn to such an extent that desired strength, elongation and Young's modulus can be obtained. However, a side-by-side composite filament having excellent yarn qualities and adhesive strength can be obtained at a temperature of 80° C. to 150° C.

Entirely similar results to those indicated in Example 5 and its Table 5 are obtained when the composite filaments according to Examples 2, 3, and 4 are substituted and examined as in Example 5.

EXAMPLE 6

In the polypropylene-nylon-11.12 side-by-side composite filament as described in Example 3, conjugate spinning and drawing were effected in the same manner as described in Example 3 except that the conjugate ratio was varied. The obtained results are shown in the following Table 6.

TABLE 6

| Conjugate ratio of polypropylene to nylon-11.12 (volume ratio) | 9:1 | 8:2 | 7:3 | 5:5 | 3:7 | 2:8 | 1:9 |
|---|---|---|---|---|---|---|---|
| Percent of crimp | 29 | 57 | 66 | 72 | 65 | 56 | 31 |
| Adhesive strength (g./cm.) | 44 | 51 | 62 | 68 | 63 | 53 | 42 |

As seen from Table 6, the composite filament has an improved crimpability and adhering property in the conjugate ratio within the range of 8:2 to 2:8 and more improved effects are obtained in the range of 7:3 to 3:7, but desired crimpability and adhering property could not be obtained beyond the above described range.

Entirely similar results to those indicated in Example 6 and its Table 6 are obtained when the combination of polyolefins and polyamides specified in Examples 1, 2 and 4 are examined in the different conjugate ratios of Table 6.

EXAMPLE 7

A blended polymer mixed polyethylene used in Example 1 and polypropylene used in Example 3 in a weight ratio of 8:2, and nylon-12 used in Example 1 were conjugate spun and drawn in the same manner as described in Example 1 to obtain a composite filament.

The filament had a strength of 4.2 g./d., an elongation of 29%, a Young's modulus of 24.4 g./d., a percent of crimp of 75% and an adhesive strength of 105 g./d.

What is claimed is:

1. Polyolefin-polyamide composite filament consisting of a fiber-forming polyolefin component and a fiber-forming polyamide component bonded uniformly in a side-by-side relationship extending uniformly along the entire length of said filament and having an excellent crimp-developability upon exposure to heat or a swelling agent without splitting and cleavage of the two components, in which the polyolefin component is a member of the group consisting of polyethylene, polypropylene, the copolymers thereof and the blended polymers thereof, and the polyamide component is a member of the group consisting of nylon-11, nylon-12, nylon-11.10, nylon-11.11 and nylon-11.12, and a ratio by volume of the polyolefin to the polyamide is 2:8 to 8:2.

2. The composite filament of claim 1, wherein said polyolefin component is polyethylene.

3. The composite filament of claim 1, wherein said polyolefin component is polypropylene.

4. The composite filament of claim 1, wherein said polyolefin component is a blend of polyethylene and polypropylene.

5. The composite filament of claim 1, wherein said ratio is from 7:3 to 3:7.

6. A method of producing polyolefin-polyamide composite filament having an excellent crimp-developability upon exposure to heat or a swelling agent without splitting and cleavage of the two components, which comprises separately melting a fiber-forming polyolefin component selected from the group consisting of polyethylene, polypropylene, the copolymers thereof and the blended polymers thereof, and a fiber-forming polyamide component selected from the group consisting of nylon-11, nylon-12, nylon-11.10, nylon-11.11, and nylon-11.12, extruding the melted polymers simultaneously through a common orifice in a side-by-side relationship in a ratio by volume of 2:8 to 8:2 to produce a composite filament in which the polymers are extended and bonded uniformly along the entire length of said filament, and then heat drawing the resulting composite filament at a temperature of 70° C. to 150° C.

References Cited

UNITED STATES PATENTS

| | | | |
|---|---|---|---|
| 2,071,250 | 2/1937 | Carothers | 260—106 |
| 2,071,253 | 2/1937 | Carothers | 260—112 |
| 2,130,523 | 9/1938 | Carothers | 260—124 |
| 2,130,948 | 9/1938 | Carothers | 260—78 X |
| 2,190,770 | 2/1940 | Carothers | 260—13 |
| 3,038,236 | 6/1962 | Breen | 264—Bicomp. Dig. |
| 3,117,906 | 1/1964 | Tanner | 264—Bicomp. Dig. |
| 3,161,914 | 12/1964 | Bloomfield et al. | 264—Bicomp. Dig. |
| 3,244,785 | 4/1966 | Hollandsworth | 264—Bicomp. Dig. |
| 3,399,108 | 8/1968 | Olson | 264—Bicomp. Dig. |
| 3,418,200 | 12/1968 | Tanner | 264—171 X |
| 3,458,390 | 6/1969 | Ando et al. | 264—171 X |
| 3,459,846 | 8/1969 | Matsui et al. | 264—168 X |
| 3,514,498 | 5/1970 | Okazaki et al. | 260—857 |
| 3,536,802 | 10/1970 | Uraga et al. | 264—171 |

JAY H. WOO, Primary Examiner

U.S. Cl. X.R.

264—Dig. 26, 168, 171